United States Patent [19]

Sadakari et al.

[11] Patent Number: 5,454,459
[45] Date of Patent: Oct. 3, 1995

[54] TORQUE FLUCTUATION ABSORBING APPARATUS

[75] Inventors: Shuji Sadakari, Kariya; Masakazu Kamiya, Toyoake; Kiyonori Kobayashi, Chiryu, all of Japan

[73] Assignee: Aisin Seiki Kabushiki Kaisha, Kariya, Japan

[21] Appl. No.: 143,747

[22] Filed: Nov. 1, 1993

[30] Foreign Application Priority Data

Nov. 2, 1992 [JP] Japan .................. 4-315536

[51] Int. Cl.⁶ .............. F16D 3/66; F16D 3/80; F16F 15/129; F16F 15/173
[52] U.S. Cl. .................. 192/55.61; 192/200.1; 74/574; 464/24; 464/68
[58] Field of Search ............ 74/574; 192/30 V, 192/55, 70.17, 106.1, 106.2; 464/24, 66, 68

[56] References Cited

U.S. PATENT DOCUMENTS

| | | | |
|---|---|---|---|
| 4,274,524 | 6/1981 | Nakane | 192/48.3 |
| 4,351,167 | 9/1982 | Hanke et al. | 464/24 |
| 4,739,866 | 4/1988 | Reik et al. | 192/70.17 |
| 4,783,895 | 11/1988 | Reik | 29/434 |
| 4,788,844 | 12/1988 | Reik et al. | 74/574 |
| 4,946,420 | 8/1990 | Jäckel | 464/7 |
| 5,030,167 | 7/1991 | Jäckel | 464/67 |
| 5,040,433 | 8/1991 | Reik et al. | 74/574 |
| 5,052,978 | 10/1991 | Hanke | 464/24 |
| 5,070,979 | 12/1991 | Ohtsuka et al. | 192/54 |
| 5,072,818 | 12/1991 | Kuhne | 192/106.1 |
| 5,085,617 | 2/1992 | Stretch | 464/27 |
| 5,088,964 | 2/1992 | Kuhne | 464/68 |
| 5,097,722 | 3/1992 | Fukushima | 74/574 |
| 5,103,688 | 4/1992 | Kühne | 74/574 |
| 5,180,044 | 1/1993 | Fukushima et al. | 192/106.1 |
| 5,194,044 | 3/1993 | Jäckel et al. | 464/24 |
| 5,194,045 | 3/1993 | Hanke | 464/24 |
| 5,242,328 | 9/1993 | Friedmann et al. | 464/24 |

FOREIGN PATENT DOCUMENTS 63-13919  1/1988  Japan .
1-255738  10/1989  Japan .

*Primary Examiner*—Richard M. Lorence
*Attorney, Agent, or Firm*—Burns, Doane, Swecker & Mathis

[57] ABSTRACT

A torque fluctuation absorbing apparatus includes drive plates coupled to an input shaft from an engine, a flywheel supported rotatably on the input shaft, a driven disc radially outwardly extending between the opposed drive plates and fixed on the flywheel, and a pair of L-shape thrust members located in a space between the opposed drive plates and forming a liquid chamber. The lining secured to outer side surfaces of the thrust members are brought into frictional engagement with inner side surfaces of the drive plates when a liquid pressure in the chamber is increased and the thrust members are axially moved.

7 Claims, 2 Drawing Sheets

TORQUE FLUCTUATION ABSORBING APPARATUS

BACKGROUND OF THE INVENTION

1. Field of the Invention

The present invention relates to a torque fluctuation absorbing apparatus which is used for absorbing the torque vibration from an input shaft coupled to an engine.

2. Description of the Related Art

It is known that a rotational torque from a vehicle's engine has an undesired range of torque fluctuation due to the cycle-by-cycle vibration associated with combustion of the engine and such torque fluctuation or vibration should be absorbed in a power train of the vehicle. In the event rotational torque having a large torsional fluctuation is directly supplied to a power transmission or gear box, it would be damaged, consequently, the input shaft, such as a crank shaft of the engine, provided with a flywheel which is cooperated with a clutch mechanism having a damper.

For purpose of decreasing the range of the torque fluctuation at low engine speed, the inertia member such as the flywheel is divided into an annular driving plate member and a flywheel member, and the damper is interposed between the driving plate and the flywheel member.

The conventional structures having the divided inertia members and the interposed damper are described in the specifications of U.S. Pat. No. 4,274,524, U.S. Pat. No. 4,739,866 and U.S. Pat No. 5,180,044.

As is apparent from the disclosures of these prior specifications, the conventional damper is composed of coil springs which are deformed by the twist or rotation of the driving plate member relative to the flywheel member, or a combination of coil springs and viscous liquid.

It is desired that the damping action be low when a small range of torque fluctuation is produced at a high engine speed, and that the damping action be high when a large range of torque fluctuation is produced at a low engine speed such as below the engine idling speed. However, the conventional damping mechanisms are insufficient to realize the damping actions as described above.

SUMMARY OF THE INVENTION

It is therefore one object of the present invention to provide a torque fluctuation absorbing apparatus which will obviate the conventional drawbacks as mentioned above.

It is another object of the present invention to provide a torque fluctuation absorbing apparatus which will absorb the undesired torque vibration at low engine speed and also at high speed.

In order to accomplish the above object, this invention provides a torque fluctuation absorbing apparatus comprising drive plate means coupled to a driving shaft of a power source means, flywheel means arranged in co-axial relation with the drive plate means and rotated relative to the drive plate means, and damper means providing a torque transmission path between the drive plate means and the flywheel means, the damper means producing damping actions due to the pressure difference of a viscous liquid and frictional resistance generated when a liquid pressure is applied to the drive plate means.

There is further provided a torque fluctuation absorbing apparatus comprising a first drive plate coupled to an input shaft, an annular outer ring fixed on an outer peripheral end portion of the first drive plate, a second drive plate opposed to the first drive plate and fixed to the outer ring, a flywheel member supported rotatably on the input shaft, a driven disc secured to the flywheel and extending radially outwardly between both the drive plates, resilient means carried on the driven disc for transmitting a rotational torque from the drive plates to the driven disc, a pair of L-shape thrust members arranged between the opposed drive plates to define a liquid chamber, piston means located in the liquid chamber and slidable together with the thrust members in a circumferential direction when the driven disc is twisted relatively to the drive plates, choke means formed in the liquid chamber, lining means interposed between inner side surfaces of the drive plates and outer side surfaces of the thrust members for producing a frictional resistance when a liquid pressure in the chamber is increased due to the circumferential movement of the piston means toward the choke means, and clutch means cooperating with the flywheel and coupled to an output shaft.

Under a state where a sudden torque fluctuation is produced, the drive plates are considerably twisted relative to the driven disc so that the pistons are moved in the circumferential direction together with the driven disc and a pressure difference across each choke in the viscous liquid chamber is generated. The pressure difference forces the thrust members to be axially moved and the linings are brought into frictional engagement with the drive plates. This will absorb the sudden torque fluctuation.

DETAILED DESCRIPTION OF THE PREFERRED EMBODIMENT

Figure 1:
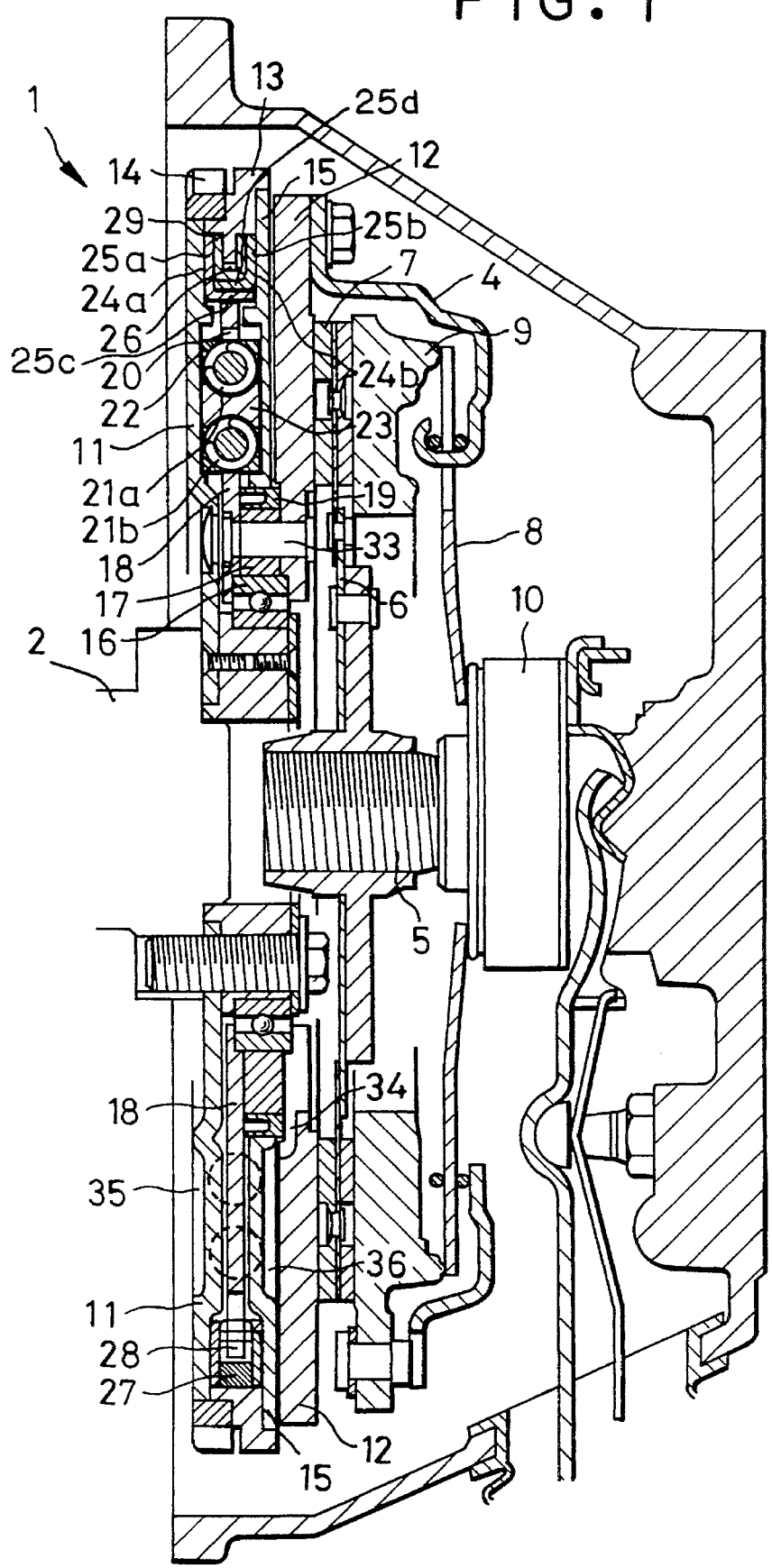
FIG. 1 is a vertical sectional view of an apparatus which embodies one embodiment of the present invention.

Referring now to drawings, there is shown one embodiment of the present invention adapted in a torque fluctuation absorbing apparatus for automotive vehicles which is indicated by reference numeral 1 and coupled to an engine crank shaft, that is a driving or input shaft 2.

The apparatus 1 includes a flywheel 12 and a cover 4 secured to one side of the flywheel 12. A driven or output shaft 5 is provided at its one end with a clutch disc 6 having a lining 7 slidable in relation to one side surface of the flywheel 12. The lining 7 is urged to one side surface of the flywheel 12 through a pressure plate 9 which is cooperates with a diaphragm spring 8 so as to make a frictional abutment condition between them. The advance movement of a collar 10 along the output shaft 5 forces the lining 7 to be disengaged from one side surface of the flywheel 12.

An inertia member is divided into the flywheel 12 and a drive plate member which is composed of a first drive plate 11 and a second drive plate 15. These drive plates 11, 15 are disposed in the manner illustrated in FIG. 1. An outer ring 13 having a ring gear 14 is secured to outer peripheral end portions of these drive plates 11, 15. The flywheel 12 is supported on the input shaft 2 through a bearing 16 and a ring 17.

A driven disc 18 extends outwardly between the opposed drive plates 11, 15 and an inner peripheral end portion thereof is secured to the corresponding portion of the flywheel 12 by means of the ring 17 and rivets 33. A seal member 19 is interposed between the ring 17 and the second drive plate 15. Three holes or cut-out portions 20 are made on the driven disc 18 with even spaces between these cut-out portions 20 in a rotational direction. Three sets of springs each comprising a couple of springs 21a, 21b are disposed within each cut-out portion 20. The out-side spring 21a is parallel to the in-side spring 21b in a radial direction and these springs 21a, 21b are seated at both ends on spring seat members 22 which each have projections 32 to be inserted into central hollow portions of the springs 21a, 21b. Separators 23 are disposed between each outside and in-side spring 21a, 21b which form a set to restrict unexpected movement of the spring seat members 22 and prevent interference of the out-side and in-side springs 21a, 21b.

The drive plates 11, 15 have concave portions 35, 36 which approach to each other and extend radially and circumferentially to abut on the spring seat members 22 disposed at end places of each cut-out portion 20 and a rotational torque is transmitted from the drive plates 11, 15 to the driven disc 18. When the drive plates 11, 15 are twisted to the circumferential front side or rear side relative to the driven disc 18, the concave portions 35, 36 for engagement with the spring seat members 22 deform the springs 21a, 21b. The deformation of the springs 21a, 21b assists in transmitting the rotational torque from the drive plates 11, 15 to the driven disc 18 and in absorbing torsional vibration.

Both the side surfaces of each spring seat member 22 are in slidable contact with opposed side surfaces of the drive plates 11, 15 and each spring seat member 22 is moved along the opposed drive plates 11, 15 without undesirable inclination of the springs 21a, 21b. It is desired to form holes or grooves on the spring seat members 22 to reduce frictional resistance. The spring arrangement described above enables an axial length of the springs 21a, 21b to be shortened and a large torsional vibration to be absorbed.

L-shape thrust members 25a, 25b are disposed in a space defined by the opposed drive plates 11, 15 and the annular outer ring 13, but outward the outer peripheral end portion of the driven disc 18. The axially extending portions of the thrust members 25a, 25b are placed over one another to define an annular liquid chamber 26 for viscous liquid. The chamber 26 is divided into four chambers by four slidable pistons 27 inwardly protruding from the inner peripheral surface of the outer ring 13 and opening to an inside. Opposed legs of each piston 27 are held at cut-out places formed on the axially extending portions of the thrust members 25a, 25b. Radial projections 28 of the driven disc 18 are inserted into the opening of each piston 27 so that the rotational twist of the driven disc 18 relative to the drive plates 11, 15 causes the thrust members 25a, 25b and the pistons 27 to be rotated in the circumferential direction.

Side surfaces of the thrust members 25a, 25b which oppose the inner side surfaces of the drive plates 11, 15 are provided with linings 24a, 24b for clutch engagement therewith.

Stoppers 29 are provided between two pistons 27 and secured to the inner peripheral surface of the outer ring 13 to form a choke 30 between the axially extending portion of the thrust member 25b and an inner surface of each stopper 29, respectively. Viscous liquid such as grease is filled in the chamber 26. The left side and right side spaces or volumes 26a, 26b of each stopper 29 are varied depending upon the circumferential movement of the pistons 27.

Figure 2:
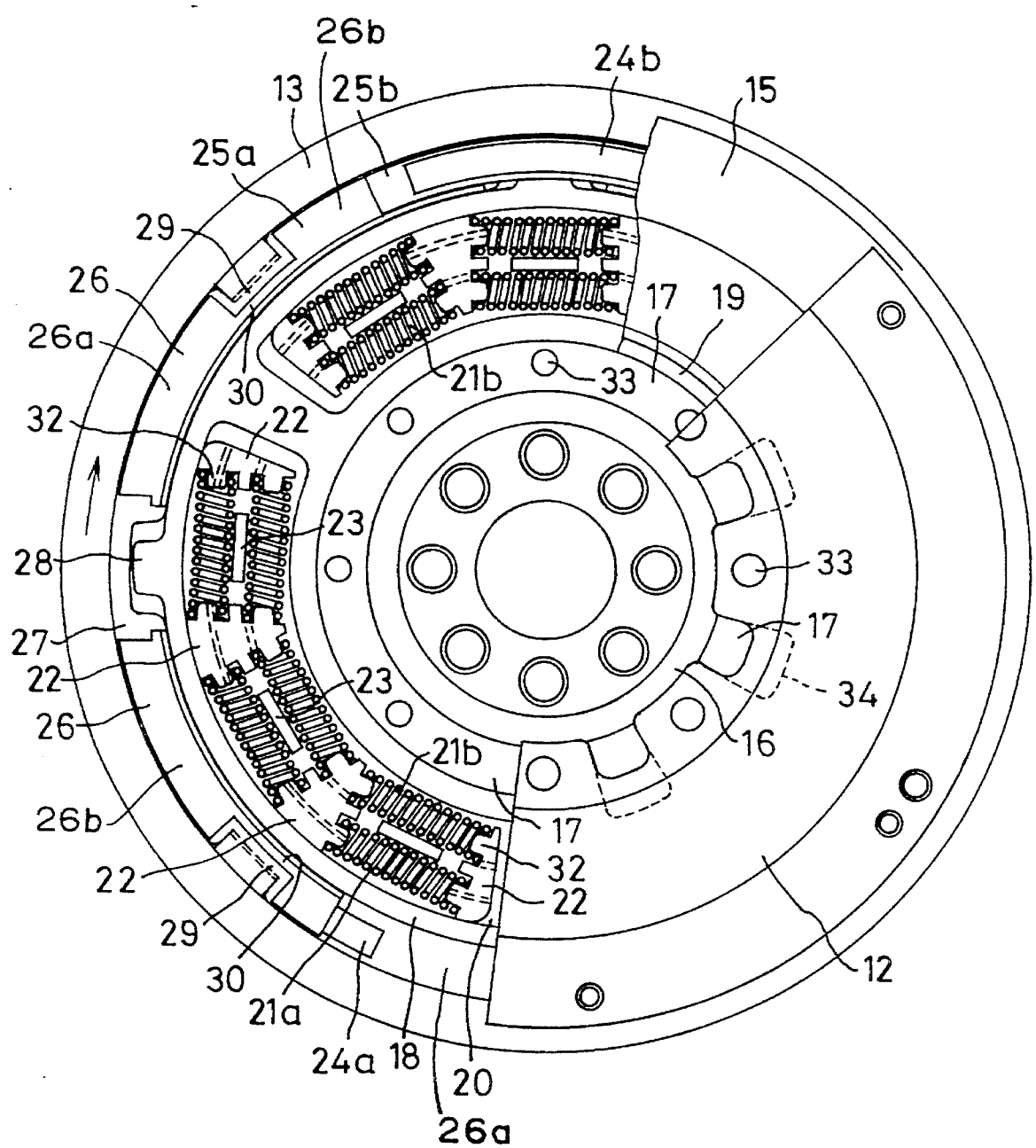
FIG. 2 is a fragmentary sectional plane view of the apparatus illustrated in FIG. 1.

A rapid torque fluctuation applied to the drive plate 11 is transmitted to the driven disc 18 through the springs 21a, 21b so that the projections 28 of the driven disc 18 press the pistons 27 in one direction. At this stage, the circumferential movement of each piston 27 as indicated by an arrow in FIG. 2 will compress the liquid in the first space 26a divided by the stopper 29 and the compressed liquid in the first space 26a will flow therefrom to the second space 26b through each choke 30. The flow resistance produced when the viscous liquid flows through each choke 30 converts the sudden torque fluctuation into a thermal energy. As a consequence, the range of the large torque fluctuation becomes small and a constant speed rotation of the driven disc 18 is developed. In this case, the pressure difference across each stopper 29 is diminished and the flow resistance by each choke 30 becomes small so that a torque transmission through the coil spring 21a, 21b is performed.

The axially extending annular portions 25c, 25d of the L-shape thrust members 25a, 25b are placed over one another to be axially slidable with respect to each other and press the linings 24a, 24b on the inner side surfaces of the first and second drive plates 11, 15 when high pressure is produced in each space 26a or each space 26b. The linings 24a, 24b secured to the outer side surfaces of the members 25a, 25b are brought into frictional engagement on the inner side surfaces of the drive plates 11, 15 due to the pressure in the space 26a or 26b, so that the frictional resistance due to the linings 24a, 24b and the flow resistance due to the chokes 30 are generated and a rotational torque having a small range of torsional fluctuation is transmitted to the driven disc 18. This is effective in the low speed range of the engine and the objectionable torque transmission to the output shaft 5 at low engine speed is avoided.

Plural cut-outportions 34 are formed on the inner peripheral end portion 12 with even space in a circumferential direction, and the bearing 16 and the oil seal member 19 are partially opened toward the atmosphere through the cut-out portions 34 to supply fresh air to the bearing 16 and the oil seal member 19. This makes it possible to efficiently cool the bearing 16 and the oil seal member 19.

Obviously, many modifications and variations may be made in light of the above teaching and the invention should be defined only by the appended claims as follows.

What is claimed is:

1. A torque fluctuation absorbing apparatus comprising a first drive plate coupled to an input shaft, an annular outer ring fixed on an outer peripheral end portion of said first drive plate, a second drive plate opposed to said first drive plate and fixed to said outer ring, a flywheel member supported rotatably on said input shaft, a driven disc secured to said flywheel and extending radially outwardly between said first and second drive plates, resilient means carded on said driven disc for transmitting a rotational torque from said first and second drive plates to said driven disc, a pair of L-shaped thrust members arranged between the opposed first and second drive plates to define a liquid chamber, piston means located in said liquid chamber and slidable together with said pair of thrust members in a circumferential direction when said driven disc is twisted relatively to said first and second drive plates, choke means formed in said liquid chamber, lining means interposed between inner side surfaces of said first and second drive plates and outer side surfaces of said thrust members for producing a frictional resistance when liquid pressure in said liquid chamber is increased due to circumferential movement of said piston means toward said choke means, and a clutch device cooperating with said flywheel and coupled to an output shaft.

2. A torque fluctuation absorbing apparatus as set forth in claim 1, wherein said lining means includes linings fixed on the outer side surfaces of said thrust members and brought into frictional contact with the inner side surfaces of said drive plates when the opposed thrust members are moved in an axial direction due to the increase in liquid pressure in said chamber.

3. A torque fluctuation absorbing apparatus as set forth in claim 2, wherein said driven disc is provided with a plurality of windows, said resilient means including three sets of springs each having at least two coil springs which are disposed in the windows formed on said driven disc, and spring seat members receiving ends of said coil springs.

4. A torque fluctuation absorbing apparatus as set forth in claim 3, wherein each L-shaped thrust member includes an axially extending portion, said choke means including stoppers extending radially inwardly from said outer ring to define chokes between inner faces of said stoppers and the axially extending portion of one of said thrust members.

5. A toque fluctuation absorbing apparatus as set forth in claim 1, wherein said pair of L-shaped thrust members each have a radially extending portion and an axially extending portion located radially inwardly of the radially extending portion, said lining means including a lining provided on an outer surface of the radially extending portion of each thrust member, the axially extending portion of one thrust member overlapping the axially extending portion of the other thrust member.

6. A torque fluctuation absorbing apparatus as set forth in claim 1, wherein said piston means includes four pistons extending inwardly from an inner peripheral surface of said outer ring to divide said liquid chamber into four chambers.

7. A torque fluctuation absorbing apparatus as set forth in claim 6, wherein each piston includes a pair of opposed legs between which is defined an opening, said driven disc including a plurality of projections which are each disposed in one of the openings defined by the opposed legs of one of the pistons.

* * * * *